May 14, 1963  J. BOCHAN  3,089,515

THREE-WAY VALVE

Filed Nov. 13, 1961

INVENTOR.
JOHN BOCHAN
BY
HIS ATTORNEY

3,089,515
THREE-WAY VALVE
John Bochan, Louisville, Ky., assignor to General Electric Company, a corporation of New York
Filed Nov. 13, 1961, Ser. No. 151,760
2 Claims. (Cl. 137—610)

The present invention relates to a three-way valve and is more particularly concerned with a valve structure in which one valve passage or port is movable into communication with either of two remaining ports or passages.

It is an object of the present invention to provide a three-way valve including a new and improved mechanism for operatively connecting one of the valve ports to either of the remaining valve ports.

Another object of the present invention is to provide a three-way valve including a valve plate having a pair of ports therein, a movable valve member carrying a third passage or port and means interconnecting the valve plate and valve member for positively seating the valve member in either of its two operative positions relative to the ports carried by the valve plate.

Additional objects and advantages of the present invention will become apparent as the following description proceeds and the features of novelty which characterize the invention will be pointed out with particularity in the claims annexed to and forming a part of this specification.

In carrying out the objects of the present invention, there is provided a three-way valve comprising a valve plate having a pair of spaced ports and a movable valve member having a passage or port therein for connection with either of the ports in the valve plate. The valve member and the valve plate are interconnected by means of a parallel linkage arrangement for operatively positioning the valve member in each of its two limiting positions in which the passage carried by the valve member is in direct communication with one or the other of the two ports and to disengage the valve member from the valve plate as it is transferred from one limiting position to the other. The connecting means provides an arcuate movement of the valve member which effects a fluid tight seal of the valve member with the plate in either of the operative or limiting positions and limits sliding or frictional engagement between the valve member and the valve plate as the valve member travels between its two limiting positions. A flexible boot connected to the valve member and valve plate respectively forms with the valve member and valve plate a fluid tight housing enclosing the ports.

Figure 1:
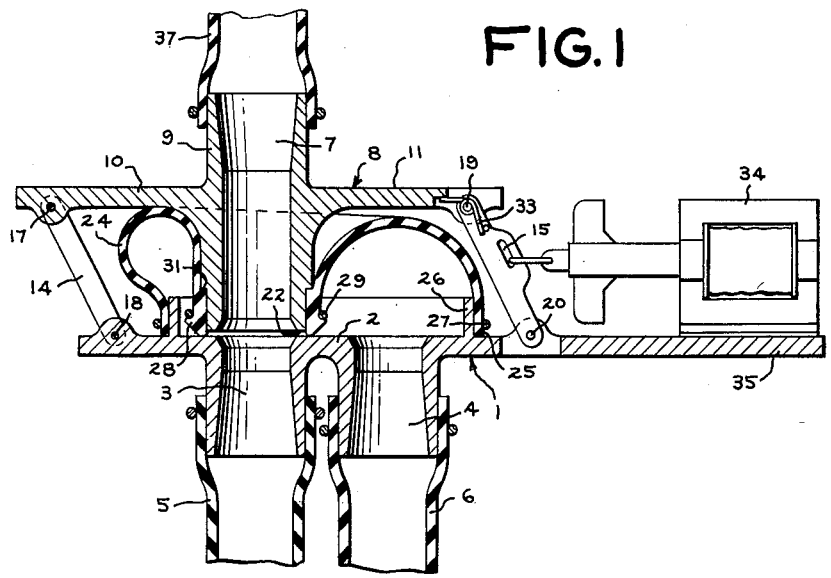
Figure 2:
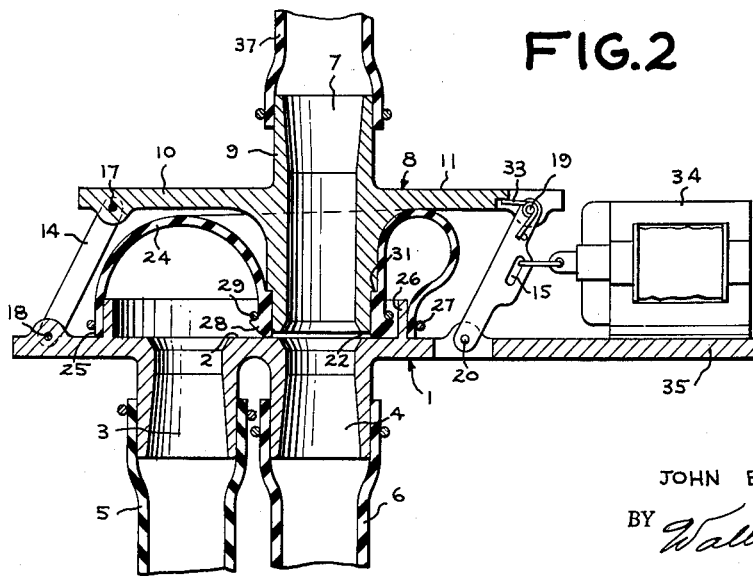

For a better understanding of the invention reference may be had to the accompanying drawing in which:

FIGURE 1 is a sectional view of an embodiment of the present invention with the valve member in one operative position; and FIGURE 2 is a sectional view similar to FIGURE 1 with the valve member in its second operative position.

With reference to the drawing, the valve illustrated therein comprises a valve plate 1 having a flat surface forming a valve seat 2. A pair of spaced ports 3 and 4 open into the seat 2 and the opposite ends of these ports are adapted to be connected to fluid conduits 5 and 6.

The third port or passage 7 for the three-way valve is provided in a movable valve member 8. This member comprises a tubular portion 9 forming a valve passage 7. The valve member 8 also includes radially or outwardly extending flanges or arms 10 and 11 on opposite sides of the tubular portion 9 and the ends of these arms or flanges 10 and 11 are connected to the valve plate 1 by means of a plurality of parallel links 14 and 15 to permit a limited arcuate movement of the valve member 8 with respect to the valve plate between two limiting positions respectively shown in FIGURES 1 and 2. In the limiting positions, the passage 7 is operatively connected to one or the other of the ports 3 and 4. At least three links are employed for a stable connection of the valve member to the valve plate. In the illustrated embodiment of the invention, a single link 15 is employed to connect the flange 11 to the valve plate 1 while a pair of spaced apart links 14 (only one of which is shown) are employed for connecting the other flange 10 to the valve plate. The links 14 are pivotally connected to the arm 10 and to the valve plate by means of pins 17 and 18 while the link 15 is similarly connected to the arm 11 and to the valve plate by pins 19 and 20.

The parallel linkage means 14 and 15 provides a connection between the valve member 8 and the plate 1 which maintains the end 22 of the tubular portion 9, or any sealing means attached thereto, in parallel relationship with the valve seat in any position of the valve member with the result that in either of its two limiting positions the passage 7 is brought into fluid tight connection with one of the ports 3 and 4. In other words, the various components of the valve are so constructed that when the parallel linkage is in its one overcenter position as illustrated in FIGURE 1 of the drawing, the lower end of the passage 7 in the movable valve member is connected with the port 3 and when the linkage is in its opposite overcenter position as illustrated in FIGURE 2 the passage 7 is in similar connection with the port 4.

In the illustrated embodiment of the invention, this is accomplished by making the arms 10 and 11 perpendicular to the axis of the passage 7 and the pivotal connections for the links 14 and 15 of equal length. As the pins 18 and 20 are also the same distance apart as the pins 17 and 19, the links 14 and 15, the arms 10 and 11 and the face plate 1 form a parallelogram. As a result any movement of the valve member 8 relative to the valve plate 1 maintains the arms 10 and 11 parallel with the plate 1 and therefore maintains the flat end 22 of the tubular portion 9 perpendicular to the valve seat 2. It will be obvious, however, that the arms 10 and 11 and other elements of the valve structure can be of various shapes provided the connections of the links to the valve member and plate are such that the pivot points represented by the four pins form the four corners of the parallelogram and passage 7 is arranged to be connected to one or the other of the ports 3 and 4 when the valve member is moved to one or the other of its limiting positions.

To prevent any leakage of fluid from the valve, there is provided a flexible boot 24 connecting the valve plate 1 around the valve seat 2, that is along a closed line bounding an area including the ports 3 and 4, with the valve member so that the boot 24, the valve plate 1 and the valve member 8 form a fluid tight valve housing enclosing the three ports. In the structure as illustrated in the drawing, the boot is of a semi-circular cross-section and extends annularly around the tubular portion 9 of the valve member 8. The outer edge 25 of the boot encircles an annular flange 26 and is maintained in fluid tight contact with the flange by a clamping ring 27. The inner edge 28 of the boot is in the form of an annular ring and is clamped to the lower end of the tubular portion 9 by means of a clamping ring 29. In order that the inner edge 28 of the boot will also serve as a resilient seal between the valve member and the valve seat 2 when the valve member is in either of its two operating positions, the edge 28 extends slightly beyond the face or surface 22 so that this extending portion of the edge 28 is in fact an extension of the passage 7 and forms the mating surface of the valve member for the valve seat. For the purpose of firmly positioning this portion of the boot relative to the valve member, the tubular portion 9 adjacent the lower end thereof and a portion of the boot adjacent the edge 28 may be provided with interlocking shoulders 31 which are designed to prevent this portion of the boot from sliding upwardly along the tubular portion 9 when the valve member is brought into engagement with the valve plate 1.

Since the pins 17 and 19 move through an arc as the valve member 8 moves from its one limiting position to the other, these pins and all parts of the valve member 8 including the seat engaging end of the valve passage 7 will also move in an arcuate path first away from the valve seat 2 and then back into engagement with the valve seat 2. Thus sliding or frictional movement of the valve member 8, or more specifically the sealing portions of the boot connected thereto, with the seat 2 is held to a minimum as the valve member is moved from one operative position to the other.

Any suitable means may be employed for positioning the valve member in each of its operative positions and biasing the valve member into sealing engagement with the valve seat. An effective means for this purpose as illustrated in the drawing comprises one or more springs 33 associated with one or more of the pivot pins to bias the valve member to one of its two operative positions and a solenoid 34 connected for example to link 15 for overcoming the bias of the spring means and move valve member 8 to its other operative position when the solenoid is energized. The solenoid 34 may conveniently be mounted on an extension 34 of the valve plate 1.

To permit relative movement between the valve plate 1 and the valve member 8, the conduit 37 connected to the valve passage 7 will also be made of some flexible material such as rubber or the like or will be so constructed as to give or flex sufficiently to permit the required movement of the valve member 8 as the valve is transferred from its one operative position to the other.

While in accordance with the patent statutes there has been described what at the present is considered to be the preferred embodiment of the invention, it is obvious to those skilled in the art that various changes and modifications may be made therein without departing from the inventon, and it is, therefore, intended by the appended claims to cover all such changes and modifications as fall within the true spirit and scope of the invention.

What I claim as new and desire to secure by Letters Patent of the United States is:

1. A three-way valve comprising a valve plate having a flat surface forming a valve seat, a pair of spaced ports opening into said seat, a valve member including a tubular portion and a radially extending flange portion, a parallel linkage means connecting said flange portion of said valve member to said valve plate with said tubular portion perpendicular to said valve plate surface and one end thereof facing said flat surface, said parallel linkage means providing for movement of said valve member relative to said valve plate through to an arcuate path between a first limiting position in which said end of said tubular portion contacts said seat in communication with one of said ports and a second limiting position in which said end of said tubular portion contacts said seat in communication with the other of said ports, a flexible annular boot having inner and outer edges and being of semi-circular cross section between said edges, means connecting said outer edge of said boot to said valve plate outwardly from said ports and between said linkage means and said ports, and means connecting the inner edge of said boot to said tubular portion whereby said boot forms with said valve plate and said tubular portion a fluid tight valve housing enclosing said ports and said one end of said tubular portion.

2. A three-way valve comprising a valve plate having a flat surface forming a valve seat, a pair of spaced ports opening into said seat, a valve member including a tubular portion and a radially extending flange portion, a parallel linkage means connecting said flange portion of said valve member to said valve plate with said tubular portion perpendicular to said valve plate surface and one end thereof facing said flat surface, said parallel linkage means providing for movement of said valve member relative to said valve plate through an arcuate path between a first limiting position in which said end of said tubular portion overlies one of said ports and a second limiting position in which said end of said tubular portion overlies the other of said ports, a flexible boot having one edge thereof connected to said valve plate outwardly from said ports and between said ports and said parallel linkage means and the other edge connected to said one end of said tubular portion, said other edge of said boot extending beyond said one end of said tubular portion to form a resilient seal with said valve seat when said member is in either of said limiting positions, said boot forming with said valve plate and tubular portion a fluid tight housing enclosing said ports.

References Cited in the file of this patent
UNITED STATES PATENTS

| | | |
|---|---|---|
| 2,380,310 | Hornbrook | July 10, 1945 |
| 2,526,825 | Nier | Oct. 24, 1950 |
| 2,781,051 | Hawley | Feb. 12, 1957 |
| 3,011,754 | Ander | Dec. 5, 1961 |